United States Patent [19]
Hervig

[11] Patent Number: 6,003,408
[45] Date of Patent: Dec. 21, 1999

[54] PEDAL WITH CUSHIONED MULTI-AXIS MOVEMENT

[76] Inventor: Dana P. Hervig, 1450 102nd St. E. Inver Grove Heights, Inner Grove Heights, Minn. 55077

[21] Appl. No.: 09/071,007

[22] Filed: May 1, 1998

Related U.S. Application Data

[63] Continuation-in-part of application No. 08/888,521, Jul. 7, 1997, Pat. No. 5,901,617.

[51] Int. Cl.$^6$ .............................. G06B 1/14; A63B 22/06
[52] U.S. Cl. ............................................ 74/594.4; 482/57
[58] Field of Search ................................ 74/594.4, 595.5, 74/594.6, 594.7, 500; 482/57, 71, 51

[56] References Cited

U.S. PATENT DOCUMENTS

| | | |
|---|---|---|
| 4,599,915 | 7/1986 | Hlavac . |
| 4,973,046 | 11/1990 | Maxwell . |
| 5,142,938 | 8/1992 | Sampson . |
| 5,251,508 | 10/1993 | Robbins ................................. 74/594.6 |
| 5,449,332 | 8/1995 | Hervig . |

*Primary Examiner*—Thomas R. Hannnon
*Assistant Examiner*—Brandon C. Stallma

[57] ABSTRACT

A pedal includes a shaft housing having a rotatable shaft coaxially within that is connectable to a crank. A vertical axis pivot base with a vertical axis insert housing extends orthogonally between opposite ends of the shaft housing. The vertical axis pivot base serves as a foundation for a pivot support frame. The pivot support frame can rotate on the vertical axis pivot base for toe-in and toe-out pivoting. The pivot support frame also facilitates longitudinal/heel-to-toe axis pivoting for inversion and eversion motion of pedal. A pedal frame is attached to the pivot support frame by inserting longitudinal axis shoulder screws through holes drilled on opposite sides of the pedal frame into longitudinal axis insert housings. Cushioning pads between the pivot support frame and the pedal frame are used to supplement muscular action in maintaining the desired angle of inversion or eversion. Vertical axis cushion pads are inserted between vertical axis pivot stops and the shaft housing to supplement muscular action in maintaining the desired angle of toe-in or toe-out pivoting.

12 Claims, 2 Drawing Sheets

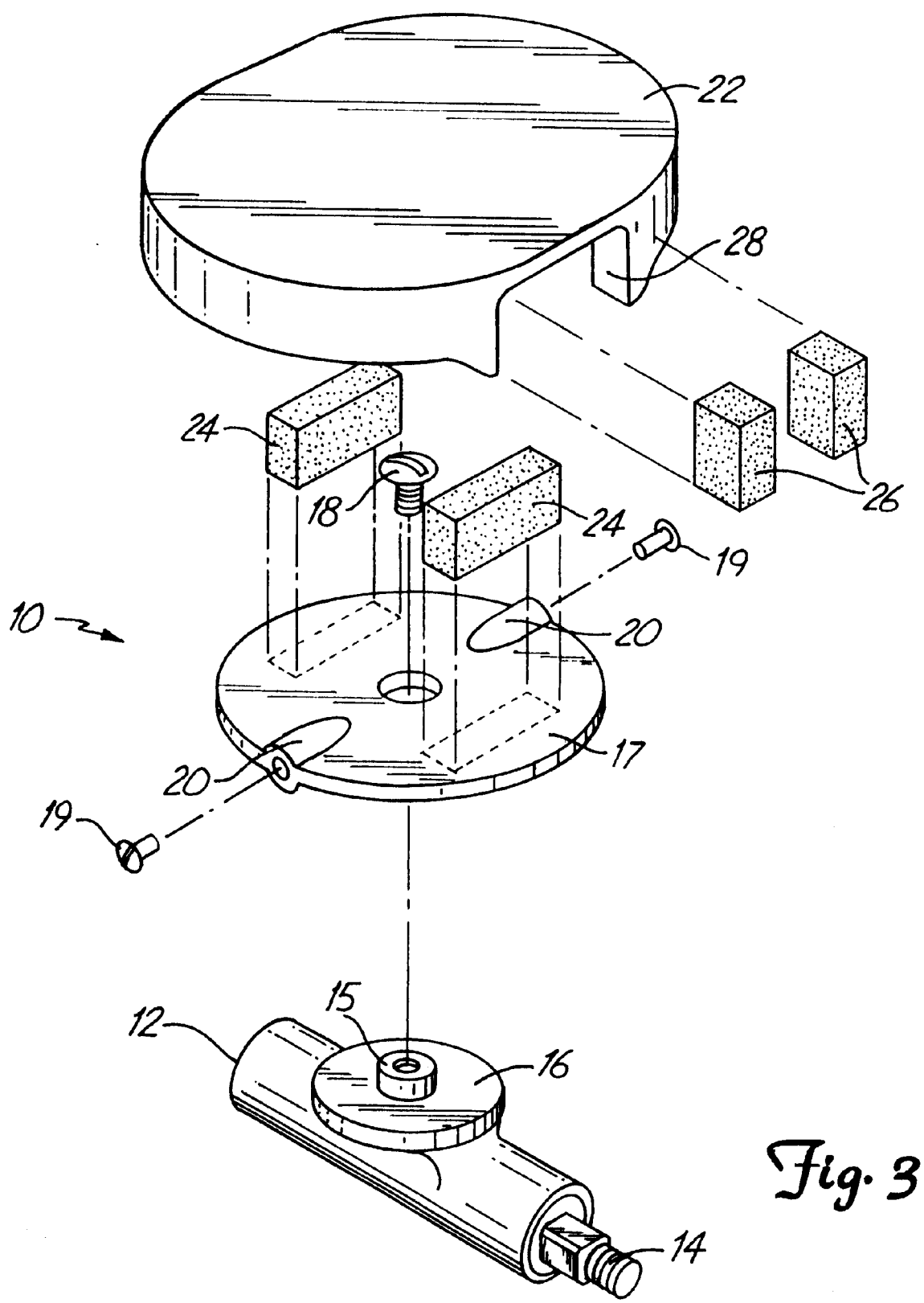

PEDAL WITH CUSHIONED MULTI-AXIS MOVEMENT

The present application is a continuation-in-part of U.S. patent application Ser. No. 08/888,521, filed Jul. 7, 1997, now U.S. Pat. No. 5,901,617.

BACKGROUND OF THE INVENTION

TECHNICAL FIELD

This invention relates to a pedal for bicycles and exercise equipment which provides pivoting about multiple axis within the pedal's frame. Specicifcally, the pedal allows pivoting on 1) a lateral axis which runs through the middle of the pedal shaft, 2) a longitudinal or heel-to-toe axis which permits inversion and eversion, and 3) a vertical axis which allows toe-in and toe-out motion. The shown pedal gives a cyclist's foot the ability to simultaneously position on these mentioned axis. The pedal permits a predetermined range and resistance of motion on the heel-to-toe axis and the vertical axis by the location of pivot stops and the placement of cushioning pads inside the pedal frame. Pedal conformity with the users body is a function of the chosen density of cushion pads and offseting pressures to the foot from opposing sides of the mentioned axis. The pedal can be used with bicycles and exercise equipment to provide improved foot positioning, more natural and effecient motion, and better distribution of pressure across the foot than a conventional pedal.

BACKGROUND OF THE INVENTION

Pedals that allow feet to pivot for improved weight distribution or comfort and pedals that use supplemental cushioning are described in detail by the references; for example U.S. Pat. Nos. 5,449,332 and 4,599,915. Imbalanced pressure distribution on the foot causes unnecessary compensation by leg muscles and joints to correct the foot's imbalance and keep legs properly aligned for efficient pedaling. The following invention provides improved foot positioning on multiple pivoting axis with cushioning supplementation adapted to modify pivoting characteristics on the vertical axis as well as the longitudinal axis.

SUMMARY OF THE INVENTION

A pedal includes a shaft housing having a rotatable shaft coaxially within that is connectable to a crank. A vertical axis pivot base with a vertical axis insert housing extends orthogonally between the ends of shaft housing. The vertical axis pivot base serves as a foundation for a pivot support frame. The pivot support frame can rotate on the pivot base for toe-in and toe-out pivoting. The pivot support frame also facilitates longitudinal axis pivoting for inversion and eversion motion of the pedal. A pedal frame is attached to the pivot support frame by inserting longitudinal axis shoulder screws through holes drilled on opposite sides of the pedal frame into longitudinal axis insert housings. The pedal frame pivots with minimal friction on the shoulder screws. The use of cushioning pads between the pivot support frame and the pedal frame supplements the pedal user's muscular action in maintaining the desired angle of inversion or eversion. Vertical axis cushion pads are inserted between vertical axis pivot stops and a portion of the shaft housing to supplement pedal user's muscular action in maintaining the desired angle of toe-in or toe-out pivoting.

BRIEF DESCRIPTION OF THE DRAWINGS

The invention will be better understood, and objects other than those set forth above will become apparent when consideration is given to the following detailed description thereof. Such description makes reference to the drawings wherein:

FIG. 3 is an exploded perspective view of the present invention.

REFERENCE NUMERALS IN DRAWINGS

Figure 1:
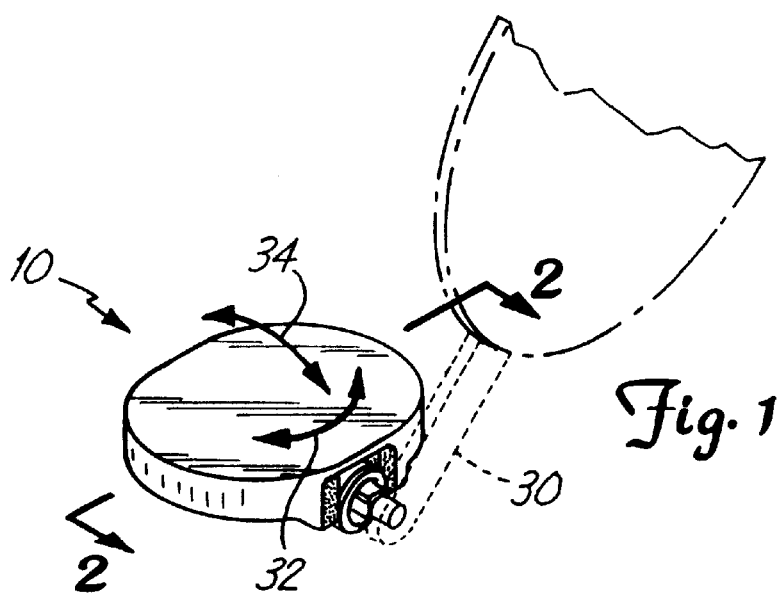
FIG. 1 is a perspective view of a pedal according to principles of the present invention.

10 Pedal
12 Shaft housing
14 Shaft
15 Vertical axis insert housing
16 Vertical axis pivot base
17 Pivot support frame
18 Vertical axis screw
19 Longitudinal axis screw
20 Longitudinal axis insert housing
22 Pedal frame
24 Longitudinal axis cushion pad
26 Vertical axis cushion pad
28 Vertical axis pivot stop
30 Crank
32 Vertical axis rotation
34 Longitudinal axis rotation

DETAILED DESCRIPTION OF THE INVENTION

The preferred embodiment of the invention will be described in detail with reference to the drawings, wherein like reference numerals represent like parts and assemblies throughout the several views. Reference to the preferred embodiment does not limit the scope of the invention, which is limited only by the scope of the claims attached hereto.

Figure 2:
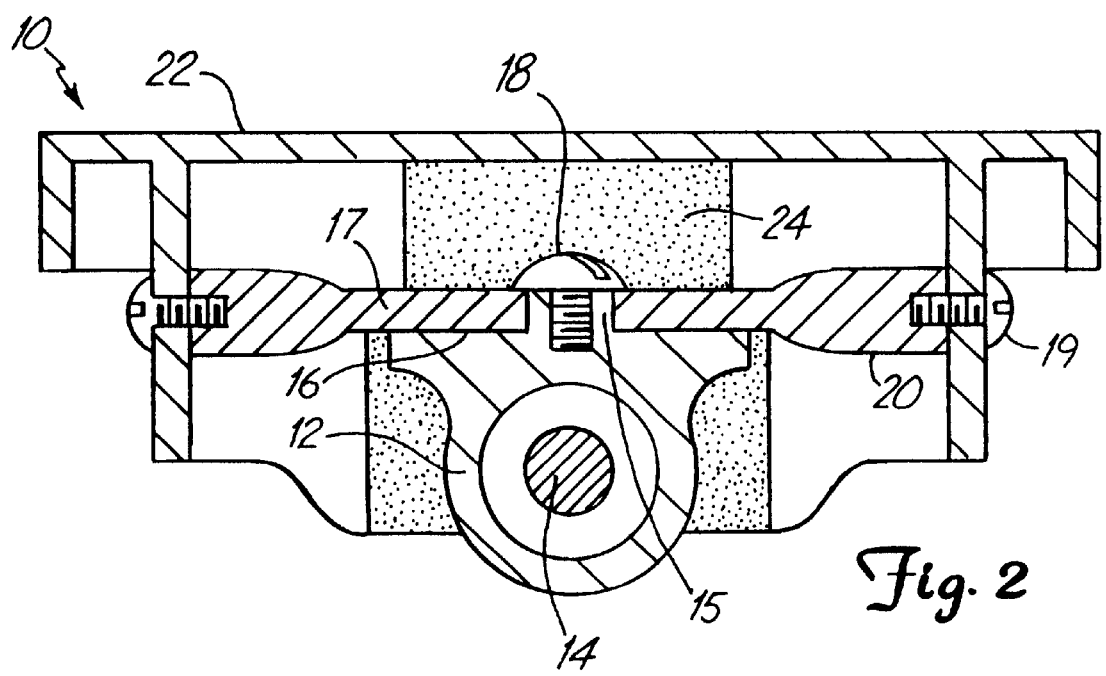
FIG. 2 is a side plan view of a pedal.

Referring now to FIGS. 1–3, the reference numeral 10, generally designates an embodiment of the pedal according to the present invention. The pedal 10 includes a shaft housing 12 having first and second oppositely disposed ends. A shaft 14 is positioned coaxially within housing 12 using conventional pedal ball bearings, bearing cones, bearing nuts, lock washers, and lock nuts (not shown) so that it may rotate freely inside housing 12. A threaded first end of shaft 14 is connectable to a crank 30. A vertical axis pivot base 16 with a vertical axis insert housing 15 extends orthogonally between opposite ends of shaft housing 12. Vertical axis pivot base 16 serves as a foundation for a pivot support frame 17. Pivot support frame 17 can rotate on pivot base 16 with minimal friction between upper and lower contact surfaces to allow for toe-in and toe-out pivoting. Vertical axis rotation arrows 32 for pedal 10 are shown in FIG. 1. A hole in pivot support frame 17 fits around the hub of vertical insert housing 15. A vertical axis screw 18 holds pivot support frame 17 to the vertical axis pivot base 16. Pivot support frame 17 also facilitates longitudinal/heel-to-toe axis pivoting for inversion and eversion motion of pedal 10. Longitudinal axis rotation arrows 34 show inversion and eversion. Pedal frame 22 is attached to pivot support frame 17 by inserting longitudinal axis shoulder screws 19 through holes drilled on opposite sides of pedal frame 22 into longitudinal axis insert housings 20. Pedal frame 22 pivots with minimal friction on the shoulder screws 19. Longitudinal axis cushion pads 24 are adhesively attached to pivot support frame 17. The use of cushioning pads 24 or other dampening material between pivot support frame 17 and pedal frame 22 supplements the pedal 10 user's muscular action in maintaining the desired angle of inversion or eversion. Pedal frame 22 is molded to provide vertical axis pivot stops 28 to limit vertical axis rotation 32. Vertical axis cushion pads 26 are inserted between vertical axis pivot stops 28 and a portion of shaft housing 12 to supplement pedal 10 user's muscular action in maintaining the desired angle of toe in or toe out pivoting. The material used in injection molding pedal frame 22, pivot support frame 17, and shaft housing 12 is 10% glass mixed with polypropylene to provide strength, flexibility, and resistance to wear from friction. Cushion pads used are die cut from adhesive back Poron TM brand cellular urathane, although springs, variable displacement airbags, etc. can be substituted to provide a similar effect.

While the invention has been described in conjunction with a specific embodiment thereof, it is evedent that different alternatives, modifications, variations, and uses will be apparent to those skilled in the art in view of the foregoing description. Accordingly, the invention is not limited to these embodiments or the use of elements having specific configurations and shapes as presented herein.

What is claimed is:

1. A pedal comprising;
   (a) pedal shaft having a pedal shaft axis extending through first and second oppositely disposed pedal shaft ends;
   (b) housing having first and second oppositely disposed ends positioned coaxially around said pedal shaft;
   (c) vertical axis pivot base that establishes a vertical pivoting axis which is generally perpendicular to said pedal shaft axis;
   (d) pivoting support frame having a first attachment means for attaching said pivoting support frame to said vertical axis pivot base and for pivoting about said vertical pivoting axis;
   (e) said pivoting support frame having a second attachment means for a pedal frame on a longitudinal pivoting axis that is generally perpendicular to and rotateable about the vertical pivoting axis.

2. The pedal according to claim 1, including a pedal frame having a vertical axis pivot stop.

3. The pedal according to claim 1, including a pedal frame having a pivot stop, wherein cushioning means between said pivot stop and the housing provides cushioning when said pedal frame is pivoted relative to said housing.

4. The pedal according to claim 1, including a pedal frame, wherein cushioning means between the pedal frame and the housing provides cushioning when said pedal frame is pivoted relative to said housing.

5. The pedal according to claim 1, wherein the housing rotates around the pedal shaft axis.

6. An exercise machine comprising at least one pedal; said pedal comprising:
   (a) pedal shaft having a pedal shaft axis extending through first and second oppositely disposed pedal shaft ends;
   (b) housing having first and second oppositely disposed ends positioned coaxially around said pedal shaft;
   (c) vertical axis pivot base that establishes a vertical pivoting axis which is generally perpendicular to said pedal shaft axis;
   (d) pivoting support frame having a first attachment means for attaching said pivoting support frame to said vertical axis pivot base and for pivoting about said vertical pivoting axis;
   (e) said pivoting support frame having a second attachment means for a pedal frame on a longitudinal pivoting axis that is generally perpendicular to and rotateable about the vertical pivoting axis.

7. The exercise machine according to claim 6, including a pedal frame having a vertical axis pivot stop.

8. The exercise machine according to claim 6, including a pedal frame having a pivot stop, wherein cushioning means between said pivot stop and the housing provides cushioning when said pedal frame is pivoted relative to said housing.

9. The exercise machine according to claim 6, including a pedal frame, wherein cushioning means between the pedal frame and the housing provides cushioning when said pedal frame is pivoted relative to said housing.

10. The exercise machine according to claim 6, wherein the housing rotates around the pedal shaft axis.

11. The exercise machine according to claim 6, which is a bicycle.

12. The exercise machine according to claim 6, which is a stationary bicycle.

* * * * *